Patented Mar. 8, 1927.

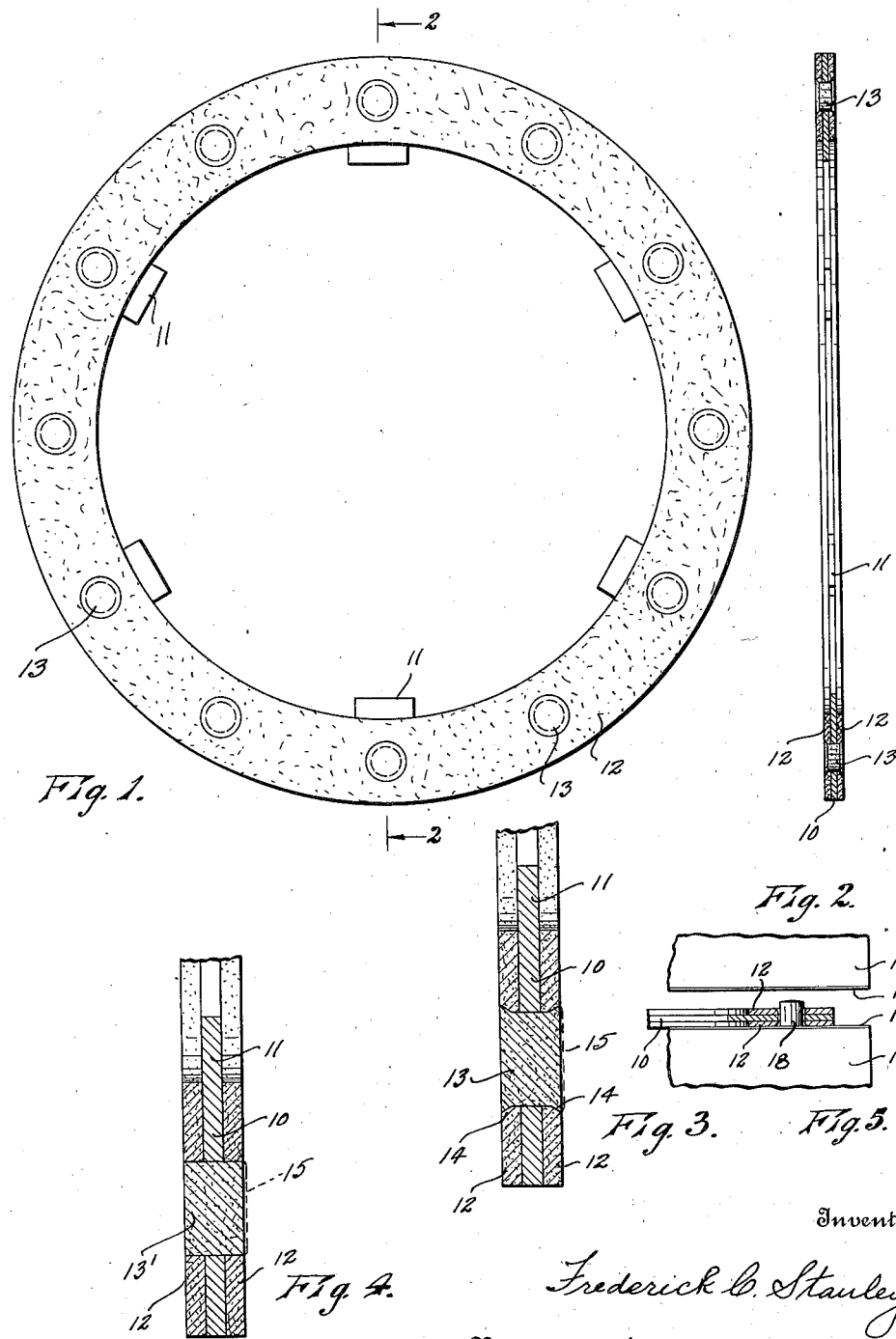

1,620,043

UNITED STATES PATENT OFFICE.

FREDERICK C. STANLEY, OF FAIRFIELD, CONNECTICUT, ASSIGNOR TO THE RAYBESTOS COMPANY, OF BRIDGEPORT, CONNECTICUT, A CORPORATION OF CONNECTICUT.

MEANS AND METHOD FOR ATTACHING NONMETALLIC FACINGS TO WORKING-CLUTCH MEMBERS.

Application filed December 10, 1924. Serial No. 755,097.

This invention relates to frictional members for friction clutches of the multiple disc or other types, and has for an object to provide means and a method of securing the fibre facings to the metallic supporting elements.

In the ordinary means and method of securing the fibre facings of multiple disc or similar clutches to the metal plates a metallic rivet is used to secure the facing to the metal plate, the opposite heads of the rivet being generally countersunk in the fibre facing so that they will not come in contact with the complementary metallic clutch member which the fibre facings engage when in driving relation. It will be apparent, however, that only a relatively small part of the possible wearing effect of the fibre facings is available because enough of the facing must be left between the ends of the rivets and the supporting plate to give the required grip on the fibre facing, and soon the facing wears down so that the heads of the rivets engage and score the surface of the complementary metal driving plate which also reduces their driving effect, and the facings must be renewed.

It is, therefore, an object of my invention to provide a securing means which will securely fasten the fibre facings to the metal disc, but is non-metallic and of a similar material to that of the fibre facing, so that it will wear down with the fibre facing without affecting the frictional driving action between the fibre facing and the complementary driving element even though the facing should be worn down very thin. It will, therefore, give a maximum service for the fibre facing, require less frequent renewal, and furthermore, it may be more easily and quickly applied and gives a more uniform securing means for the facing.

With the foregoing and other objects in view, I have devised the construction illustrated in the accompanying drawing and the method of using the same described herein, similar reference characters being employed throughout the figures of the drawing to indicate corresponding elements. In this drawing, Fig. 1 is a side elevation of a working clutch member of a multiple disc clutch showing the fibre facing secured to the metal disc by my improved securing means.

Fig. 2 is a transverse section through the same substantially on line 2—2 of Fig. 1.

Fig. 3 is an enlarged section through the disc and one of the securing elements.

Fig. 4 is a similar section of a slightly different construction, and

Fig. 5 is a diagrammatical view indicating one method of applying the elements.

In the illustration the clutch plate comprises the metal plate or flat ring 10 having the usual driving lugs 11 on one of its peripheries with the non-metallic facings 12 secured to the opposite faces of this disc or ring. These fibre facings are preferably made of asbestos fibre held together by a suitable hardening binder. In the ordinary construction these facings are secured to the plate or ring by metallic rivets countersunk in the facing. In the present construction, however, I use a securing means which is made up of powdered clutch facing material, such as asbestos fibre, mixed with a hardening binder, such a phenol resin, which will harden under the application of heat and pressure, and will give a cementing or binding action between the securing elements and the surfaces of the metal plate and the facing elements which come in contact with the surface of these elements. In Figs. 1, 2 and 3 this securing element is shown at 13, and is countersunk at its opposite ends in the facing members 12 as indicated at 14. This is the preferred construction although the countersinking is not necessary as the phenol resin in the securing element will securely cement the element to the plate 10, and the facings 12, and therefore, a straight securing element 13' may be used as shown in Fig. 4.

In the process of securing the facings to the plate a mixture of the powdered clutch facing material, such as asbestos fibre, with the powdered phenol resin is placed in the aligned openings through the facings and the plate, the proportions which I prefer to use being approximately nine parts of the asbestos fibre and one part of the phenol resin. The clutch member and the mixture of the asbestos and the phenol resin are subjected to a temperature of approximately 300° to 350° F. and considerable pressure which causes the phenol resin in the mixture to melt and run together and then harden to form a solid homogeneous securing element 13 or 13' which will not again soften under the heat generated incident to its use in a clutch. The phenol resin also thoroughly cements the elements 13 or 13' to the surfaces of the openings through the facings 12 and plate 10 thoroughly securing the elements together. The element, furthermore, is of similar material to that of the clutch facings, as it is composed principally of the same fibrous material, and therefore, the facings will wear evenly throughout their entire extent. They also increase the driving power of the facings, as no frictional surface is lost due to the countersunk openings in the usual construction, and it will be apparent the facings may be worn down practically all the way through before requiring renewal. In actual practice the inner surfaces of the facings 12 are also preferably cemented to the surface of the metal plate 10 by a similar cementing material, as the phenol resin placed between these surfaces and melted under the same application of heat as applied to the securing elements. Under such a construction the entire facing is securely fastened to the plate. If there should be any surplus material for the securing element so that after the application of the heat and pressure it projects beyond the surface of the facings as shown in dotted lines in Figs. 3 and 4 this surplus may be removed by a grinding.

In Fig. 5 is indicated merely diagrammatically a press comprising a bed 16 and a movable upper member or head 17 between which the working clutch member comprising the facings 12 and the plate 10 may be pressed and the proper pressure applied. Any suitable means, not shown, may be provided for heating these elements to the required temperature to cause the phenol resin to melt and flow. The openings in the plate and facings may be filled with the loose mixture of asbestos fibre and powdered phenol resin or a slug indicated at 18 may be made of this mixture to be placed in the aligned openings in the casing and plate. After the mixture has been applied to all the openings the whole clutch member may be subjected to the required heat and pressure so that all the securing elements are formed and set at a single operation, thus greatly simplifying and reducing the cost of manufacture. Sheets of paper 19 or other suitable material may be placed between the clutch member and the bed 16 and head 17 to prevent the securing elements sticking to these members.

Having thus set forth the nature of my invention, what I claim is:

1. A friction element comprising a metal plate and a fibre facing secured to said plate by elements composed of approximately nine parts asbestos fibre and one part of a hardening binder.

2. A friction element comprising a metal plate and a preformed fibre facing secured to said plate by independent elements extending through the plate and facing and composed of a fibre held together by a hardening binder.

3. A friction element comprising a metal plate and a preformed fibre facing secured to said plate by separate and independent elements extending through the plate and facing composed of a mixture of a fibre and phenol resin.

4. A friction element comprising a metal plate and a preformed fibre facing secured to said plate by separate elements extending through the plate and facing and composed of a mixture including asbestos fibre and phenol resin.

5. A friction element comprising a metal plate and a preformed fibre facing secured to said plate by independent elements extending through the plate and facing and composed of a mixture including asbestos fibre and a hardening binder.

6. A friction element comprising a plate and a preformed fibre facing secured to said plate by independent elements extending through the plate and facing and composed of a fibre mixed with a binding material which hardens under the action of heat and pressure.

7. A friction element comprising a plate and a preformed fibre facing secured to said plate by independent elements extending through the plate and facing and composed of asbestos fibre held together by a binder which hardens under the action of heat and pressure.

8. A friction element comprising a metal plate, a preformed fibre facing for said plate, said plate and facing having aligned openings, and a securing element in said openings for securing the facing to the plate composed of a mixture including asbestos fibre and a binding material rendered tenacious by heat and pressure.

9. A friction element comprising a metal plate and a fibre facing surface secured to said plate by elements composed of a mixture of approximately nine parts of asbestos fibre and one part phenol resin.

10. The method of securing a non-metallic clutch facing to a metallic supporting member which consists in placing in aligned openings in the facing and member a mixture of a fibre and a hardening binder, and then applying heat and pressure to said mixture to form a solid homogeneous securing member.

11. The method of securing a non-metallic clutch facing to a metallic supporting member which consists in placing in aligned openings in the facing and member a mixture of a fibre and phenol resin, and then applying heat and pressure to said mixture.

12. The method of securing a non-metallic clutch facing to a metallic supporting member which consists in placing in aligned openings in the facing and member a mixture of asbestos fibre and phenol resin, and then applying heat and pressure to said mixture.

13. The method of securing a non-metallic clutch facing to a metallic supporting member which consists in placing in aligned openings in the facing and member a mixture of asbestos fibre and a hardening binder, and then applying heat and pressure to said mixture to form a solid homogeneous securing member.

14. The method of securing a non-metallic clutch facing to a metallic supporting member which consists in placing in aligned openings in the facing and member a mixture of approximately nine parts asbestos fibre and one part phenol resin, and then applying heat and pressure to said mixture.

In testimony whereof I affix my signature.

FREDERICK C. STANLEY.